United States Patent [19]
Yoshida et al.

[11] Patent Number: 5,189,524
[45] Date of Patent: Feb. 23, 1993

[54] VIDEO CAMERA HAVING AN INDICATOR FOR WARNING OF THE OCCURRENCE OF MATTERS WHICH INTERRUPT RECORDING

[75] Inventors: Tadahiro Yoshida; Hiroyuki Tsumazawa; Tetsuo Kono, all of Osaka, Japan

[73] Assignee: Minolta Camera Kabushiki Kaisha, Osaka, Japan

[21] Appl. No.: 403,761

[22] Filed: Sep. 6, 1989

[30] Foreign Application Priority Data

Sep. 7, 1988 [JP] Japan .......................... 63-117512[U]
Sep. 7, 1988 [JP] Japan .......................... 63-117513[U]
Sep. 7, 1988 [JP] Japan .......................... 63-117514[U]
Sep. 9, 1988 [JP] Japan .......................... 63-119036[U]

[51] Int. Cl.$^5$ ............................................ H04N 5/782
[52] U.S. Cl. .................................. 358/335; 358/906; 360/6; 360/33.1; 360/71
[58] Field of Search ............ 358/310, 327, 335, 336, 358/906, 909; 360/6, 60, 66, 69, 71, 74.6, 137, 33.1; 369/53, 58

[56] References Cited

U.S. PATENT DOCUMENTS 4,967,278 10/1990 Greenbaum ................... 358/906 X
4,999,719 3/1991 Tozaki et al. .................. 358/906 X
5,023,741 6/1991 Conti et al. ...................... 360/66 X

OTHER PUBLICATIONS

Manual & Operating Instructions of Sony Video Camera Recorder "CCD-V30E" published in 1987.
Manual & Operating Instructions of Canon "VM-E1N" 8 mm Video Camera & Recorder published in 1986.

Primary Examiner—Wayne R. Young
Attorney, Agent, or Firm—Willian Brinks Olds Hofer Gilson & Lione

[57] ABSTRACT

An indicator provided on the surface of a video camera for warning of the occurrence of a matter which interrupts the recording; for example, dew on a recording head and the approach of a tape end. These occurrences during a recording operation must be informed to a subject as well as to a photographer who stands without looking into a finder of the video camera.

10 Claims, 5 Drawing Sheets

VIDEO CAMERA HAVING AN INDICATOR FOR WARNING OF THE OCCURRENCE OF MATTERS WHICH INTERRUPT RECORDING

BACKGROUND OF THE INVENTION

1. Field of the invention

This invention relates to a video camera including an indicator on the surface of the video camera.

2. Description of the prior art

It is known that indicators on the surface of a video camera indicate various warnings for a photographer.

For example, a video camera indicates a count of moving tape on a part of a liquid crystal display on the side surface of a video camera, detects that the last five minutes of the tape for recording is come and then warns that on another part of the liquid crystal display; detects that the voltage of a power source is below a predetermined level and then warns that on another part of the liquid crystal display; and detects dew on a recording head of the video camera and then warns that on another part of the liquid crystal display.

However, there is no video camera having an indicator on the surface of the video camera which indicates whether recording is being operated normally or the end of a medium for recording is near. It is important to warn that the end of the medium for recording comes during the recording operation to the subject or the photographer who stands without looking into a finder, because the subject should prepare himself for the ending, and the photographer should prepare himself for the ending and next recording. And there is no video camera having an indicator on the surface of the video camera which indicates whether recording is being operated normally or there is dew on a recording head. It is also important to warn the occurrence of dew during the recording operation. If dew is condensed on the recording head, the relation between the recording head and a medium becomes unstable and further recording operation should be stopped. So the photographer and the subject should be informed of the occurrence of dew during the recording operation And in the aforementioned video camera, many elements in the liquid crystal display are required for each detection and large space for the elements is needed. Moreover, one who looks at a certain part of the liquid crystal display can not know the occurrence of another warning.

It is also known that a video camera consists of the main body and the finder body which is angularly displaceable on the main body, and an indicator for indicating to a subject that recording is being operated is provided on the main body which provides other members, e.g. lens, microphone, grip, connecting terminals and switches.

If the indicator is provided on the main body, it is difficult to distinguish the indicator from the various members also provided on the main body, and the surface of the main body becomes in further confusion. On the other hand, if the indicator is provided on the finder body, it is difficult that one can see the indicator from the front irrespective of the position of the finder body: between the eye level position and the waist level position.

SUMMARY OF THE INVENTION

It is therefore a first object of this invention to provide a video camera that one can know whether the recording is operated normally or there is a danger of further recording because of approach of the end of the recording medium with one indicator on the video camera, or to provide a video camera that one can know whether the recording is operated normally or there is a danger of further recording because of dew with one indicator.

In order to achieve the first object, first, there are provided means for detecting the end of the medium for recording; an indicator which normally indicates whether the recording is operated or not on the surface of a video camera; and means for changing the indication state in accordance with the detection of the detecting means. Second, there are provided means for detecting dew on a recording head; an indicator which normally indicates whether the recording is operated or not on the surface of a video camera; and means for changing the indication state in accordance with the detection of the detecting means.

It is a second object of this invention to provide a video camera which consisting of a main body and the finder body which is angularly displaceable on the main body, and provide an indicator on the finder body, not on the main body, which provides various things so that one can see the indicator easily from the front irrespective of displacing of the finder body.

For the second object, there is provided a surface which can be seen from the front irrespective of the position of the finder body between the eye level and the waist level, and the indicator is provided on said surface.

It is a third object of this invention to provide a video camera having two kinds of indicators, one is provided for warning there is a danger of recording; the other is provided for indicating a kind of matter causing the danger.

For the third object the indicator for warning is provided on the surface of the video camera.

BRIEF DESCRIPTION OF THE DRAWINGS

This invention will become more fully understood from the detailed description given below and the accompanying drawings which are given by way of illustration only, and thus are not limitative of this invention, and wherein:

FIG. 6 (b) is an indication example in the finder for voltage drop;

FIG. 6 (c) is an indication example in the finder for tape end approach; and

FIG. 6 (d) is an indication example in the finder for dew condensation.

DETAILED DESCRIPTION OF THE PREFERRED EMBODIMENT

Figure 1:
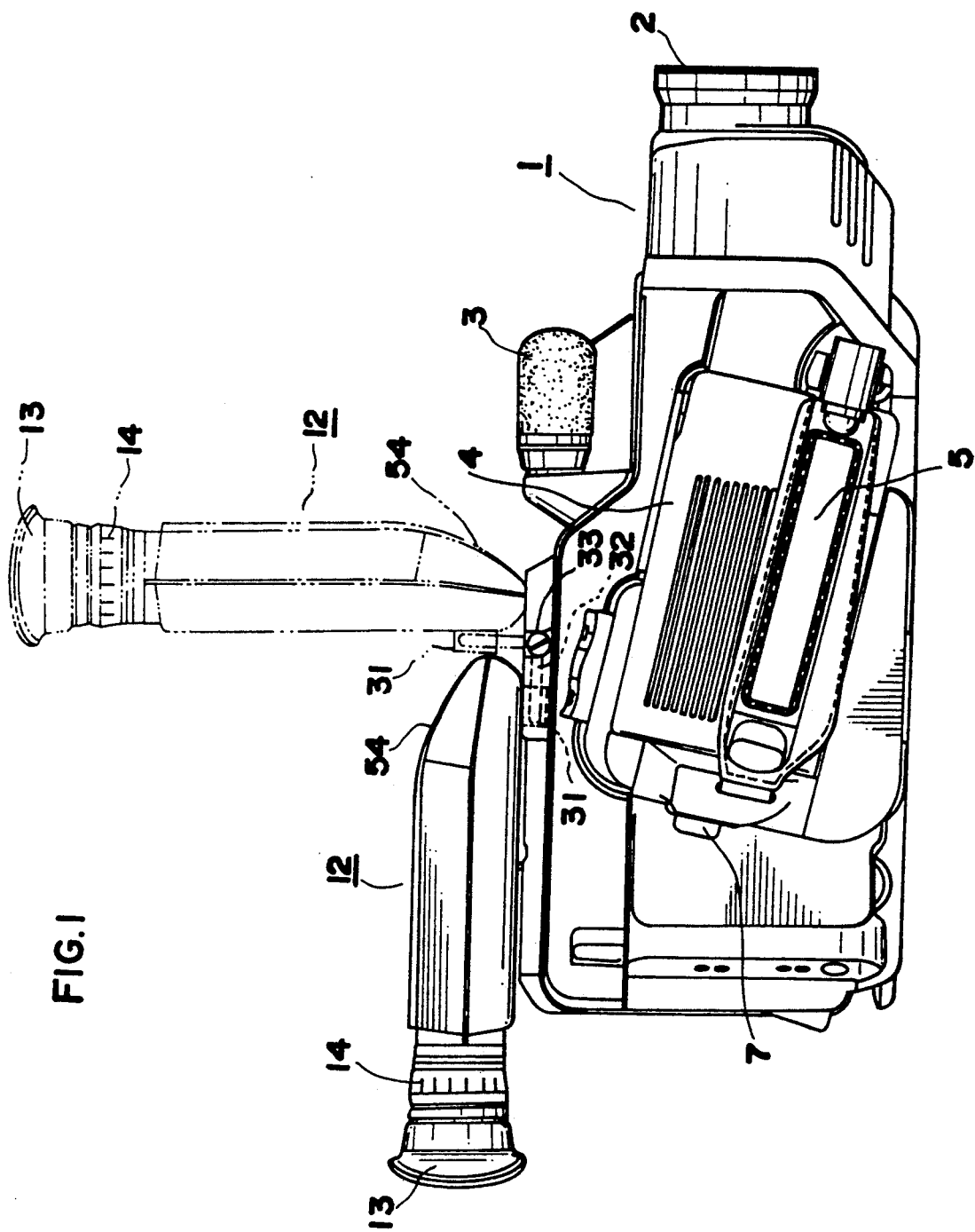
FIG. 1 is a side elevational view of an embodiment of a video camera in accordance with the present invention.

The present invention will be described in the following in connection with its embodiment of a one-body type video camera, in which is built camera and recorder, with reference to FIGS. 1 to 6.

In these Figures: reference numeral 1 designates a main body of the one-body type video camera; numeral 2 a camera lens for photographing an object; numeral 3 a sound collector microphone for collecting external sounds; and numeral 4 a grip for holding the main body 1 with the right hand of the operator. This grip 4 is arranged with a battery. Moreover: reference numeral 5 designates a band strap for fixing the operator's right hand on the grip 4; numeral 6 a zoom button for zooming the lens 2; and numeral 7 a trigger button for starting/stopping the photography (i.e., picture recording). First of all, the main switch is turned on, and the (not-shown) recording button is once depressed to cause a paused state (for camera monitoring). After this, the trigger button 7 is depressed to start the photography so that the image taken by the camera lens 2 is recorded by the recording means. Still moreover: numeral 8 designates a light receiving aperture for adjusting the white balance; numeral 9 an external power source terminal; numeral 10 an external microphone terminal; numeral 11 a cassette mounting portion for mounting a cassette having a built-in picture recording tape; and numeral 12 a finder body which will be shortly referred to as a "finder"). This finder 12 is equipped with an eyepiece 13 having a CRT therein, a ring 14 for adjusting the diopter and a projection 31.

To this projection 31, there is fixed a lever 32 which is so joined to the main body 1 that it can be turned on a pin 33 between a parallel position and a perpendicular position with respect to the photographic direction In other words, the finder 12 is so attached to the camera body 1 that it can be turned through the pin 33 between the parallel and perpendicular positions with respect to the photographic direction. In FIG. 1, the solid lines indicate the parallel position of the finder 12, and the single-dotted lines indicate the perpendicular position of the finder 12.

For the photography, the finder 12 is positioned in parallel with the photographic direction for the eye level as high as the operator's eye. For the waist level, on the other hand, the CRT can be conveniently viewed from above if the finder 12 is brought to the perpendicular position The finder 12 has its sloped front portion 54 arranged with a red light emitting diode 15, which indicates not only whether or not the main body 1 is in photography but also a warning when the battery voltage drops below a predetermined value (e.g., 9.2 V for the specified main voltage of 9.6 V), when the tape runs to the vicinity (e.g., 2 to 3 minutes before the end) of its tail or when dew is condensed on the rotary cylinder which contacts the tape for recording, as tabulated in the following.

TABLE 1

| State of Video Camera | | Indication State |
|---|---|---|
| Photography | | ON |
| Warning | Voltage Drop | Blink at 4 Hz |
| | Tape End approach | |
| | Dew Condensation | |

TABLE 1-continued

| State of Video Camera | Indication State |
|---|---|
| Others | OFF |

Figure 2:
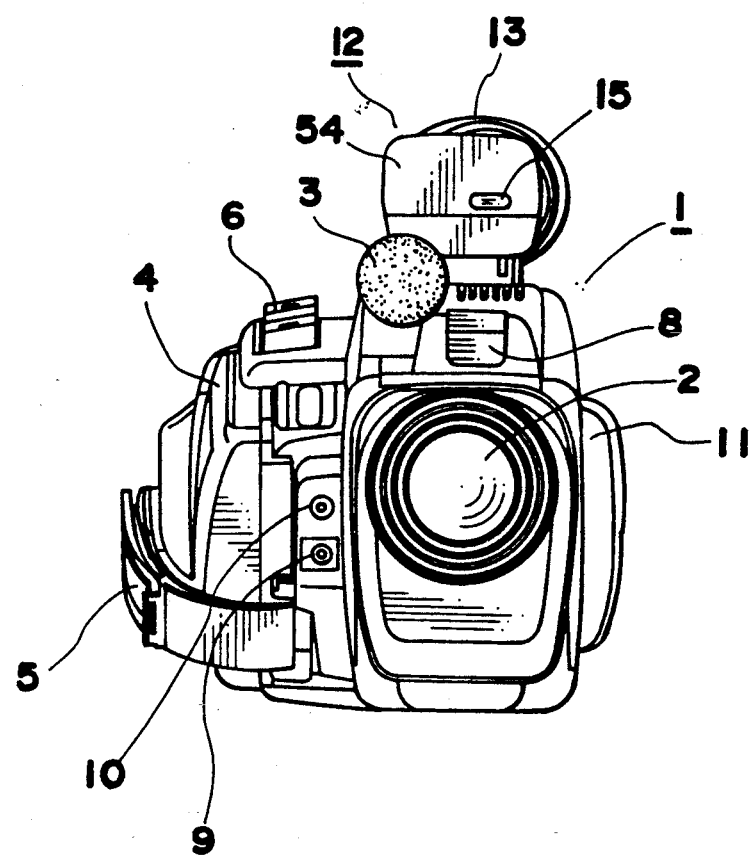
FIG. 2 is a front elevational view corresponding with the embodiment of FIG. 1 on the eye level state.

FIG. 2 is a front elevation showing the video camera in the eye level state. The red light emitting diode 15 is so apart from the main body having the various accessories that it is attractive.

Figure 3:
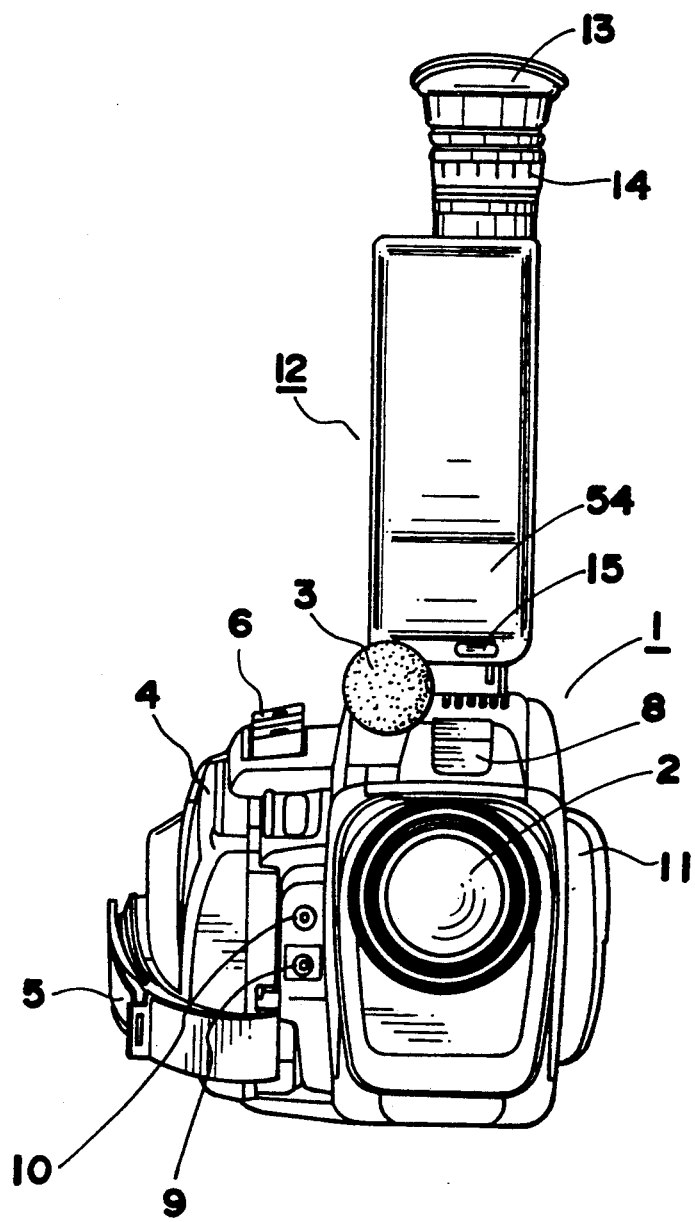
FIG. 3 is a front elevational view corresponding with the embodiment of FIG. 1 on the waist level state.

FIG. 3 is a front elevation showing the video camera in the waist level state. The finder 12 stands upright but does not conceal the light emitting diode 15.

As described above, the operator can visually confirm the indication of the light emitting diode 15 inside of the indication aperture whether the video camera might be in the eye or waist level state.

The present embodiment has its indication element exemplified by the light emiting diode, but the present invention should not be limited thereto.

Figure 4:
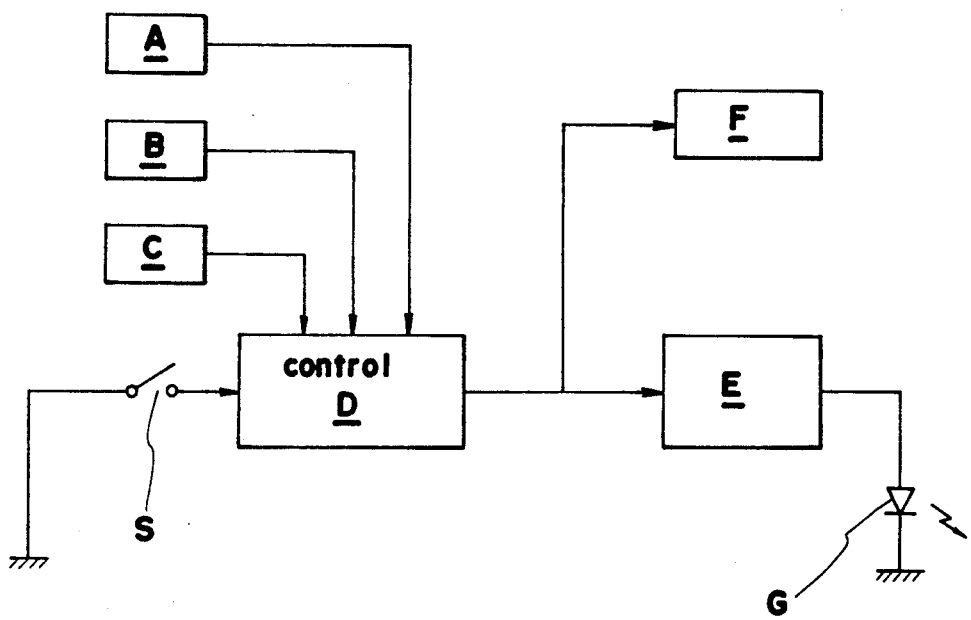
FIG. 4 is a schematic circuit diagram of the video camera to operate indicators which are provided outside the video camera and in a finder of the video camera.

In order to control the lighting of the red light emitting diode in accordance with Table 1, the video camera is equipped therein with a lighting control circuit which is constructed, as shown in FIG. 4.

Figure 5:
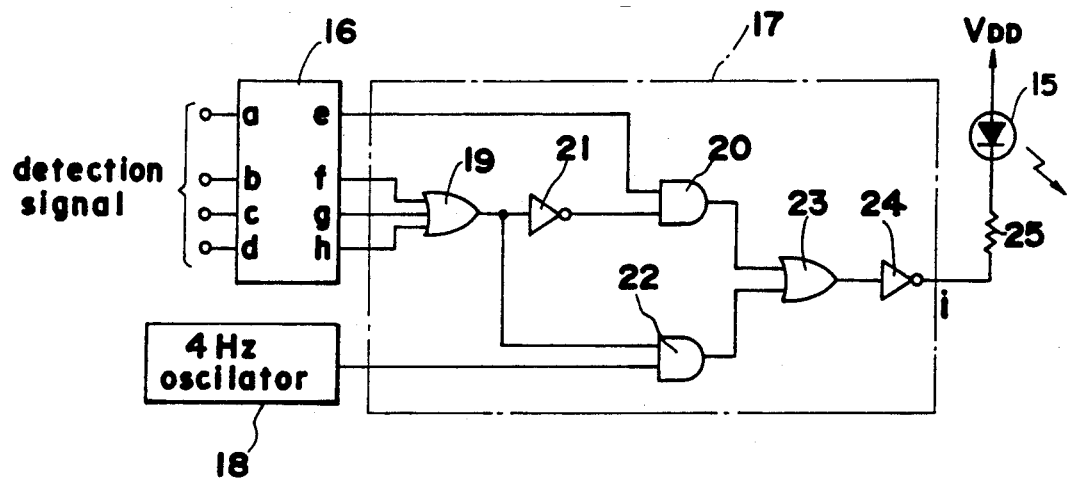
FIG. 5 is a specified circuit diagram for a part of the diagram of FIG. 4.

A part of circuit components D, E and G shown in FIG. 4 are specified in FIG. 5.

In FIG. 5: letter S designates a recording start switch as the trigger button 7; letter A a battery voltage check circuit; letter B a tape end detect circuit; and letter C a dew condensation detector, all of which are connected with a control unit D. Moreover: letter E designates an emission driver; letter F the CRT disposed in the eyepiece 13 of the finder 12; and letter G the light emitting diode 15.

The control unit D receives not only the recording start signal from the recording start switch S but also a signal indicating whether or not the battery voltage is below a predetermined level from the battery voltage detector A, a signal indicating whether or not the tape end is near from the tape end detector B, and a signal indicating whether or not there is dew from the dew condensation detector C. In response to these signals, the control unit D issues a signal to the emission driver E and the CRT F. In response to the signal from the control unit D, the emission driver E determines the emission state to excite the light emitting diode G.

In response to the signal from the control unit D, on the other hand, the CRT F also accomplishes the corresponding display.

In FIG. 5, designated at reference numeral 16 is a first control circuit which is equipped with input terminals a to d and corresponding output terminals e to h. If the detection signals indicating the photography, the battery voltage drop, the tape end and the dew condensation are inputted to the input terminals a to d, respectively, from the circuits S, A, B and C shown in FIG. 4, the first control circuit 16 outputs an H level from the corresponding one or ones of the output terminals e to h. Numeral 17 designates a second control circuit which is made operative: to prepare a control signal for controlling the lighting of the red light emitting diode 15 from both the outputs of the individual output terminals e to h of the first control circuit 16 and the oscillating output of 4 Hz of an oscillator 18; and to output its prepared control signal from its output terminal i. Numeral 19 designates a first OR gate which is made receptive of the outputs from the output terminals f, g and h of the first control circuit 16. Numeral 20 designates a first AND gate which is made receptive of both the output of the output terminal e of the first control circuit 16 and the output of the first OR gate 19 through an inverter 21. Numeral 22 designates a second AND gate which is made receptive of both the output of the first OR gate 19 and the oscillating output of 4 Hz of the oscillator 18. Numeral 23 designates a second OR gate which is made receptive of the outputs of the first and second AND gates 20 and 22. The output of the second OR gate 23 is fed through an inverter 24 and a resistor 25 to the cathode of the red light emitting diode 15.

As a result, the first control circuit 16 has all its output terminals e to h held at an L level if none of its input terminals a to d receives any detection signal. Then, all the outputs of the first and second OR gates 19 and 23 and the first and second AND gates 20 and 22 are at the L level. In this state, the red light emitting diode 15 is OFF because its cathode is fed with the inverted output of the L level coming from second OR gate 23. Next, the photography is effected to input the detection signal indicating the operation to the input terminal a of the first control circuit 16. Then, this first control circuit 16 has its output terminal e raised to the H level so that the output of the first AND gate 20 is turned from the L to H levels. As a result, the output of the second OR gate 23 is also switched from the L to H levels, and the red light emitting diode 15 is fed at its cathode with the inverted output of the H level from the second OR gate 23 so that it is turned ON. If, during this photography, any of the detection signals indicating the battery voltage drop, the tape end approach and the dew condensation is generated and fed to any of the input terminals b, c and d of the first control circuit 16, the corresponding one of the output terminals f, g and h of the first control circuit 16 is raised to the high level to switch the output of the first OR gate 19 from the L to H levels. As a result, the output of the first AND gate 20 takes the L level despite the H level is outputted from the output terminal e of the first control circuit 16, and the outputs of the second AND gate 22 and the second OR gate 23 are caused to repeat the L and H levels at 4 Hz by the oscillating output coming from the oscillator 18. Thus, the red light emitting diode 15 is blinked at 4 Hz. Not only during such photography but also in the paused state or at the step of making the main switch (i.e., when the output terminal e of the first control circuit 16 is at the L level) before the photography, the detection signal indicating the battery voltage drop or the dew condensation may be generated and inputted to the corresponding one of the input terminals b and d of the first control circuit 16. Then, the red light emitting diode 15 is also blinked at 4 Hz. The indications of the red light emitting diode 15 corresponding to the output states of the individual output terminals of the first and second control circuits 16 and 17 will be summarized in the following.

TABLE 2

| e | f, g, h | i | Indication |
|---|---|---|---|
| L | all at L | H | OFF |
| H | all of L | L | ON |
| H | one or more at H | 4 Hz | Flash at 4 Hz |
| L | one or more at H | 4 Hz | Flash at 4 Hz |

If one of the dangers of battery voltage drop, tape end approach and dew condensation takes place when the main switch is ON for the photography, the red light emitting diode 15 flashes to make warning to the outside so that the operator can promptly return to the video camera and take proper countermeasures when the visually confirms the warning, even if the stands apart from the camera.

Figure 6A:
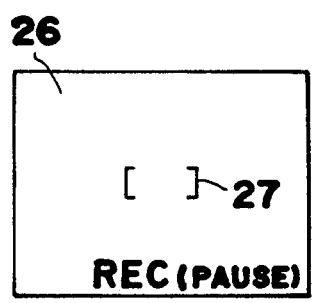
FIG. 6 (a) is an indication example in the finder for recording.
Figure 6B:
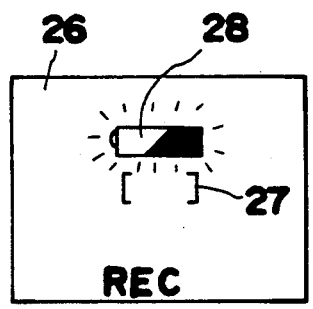
Figure 6C:
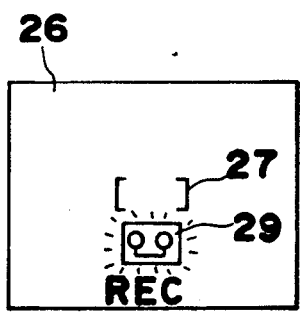
Figure 6D:
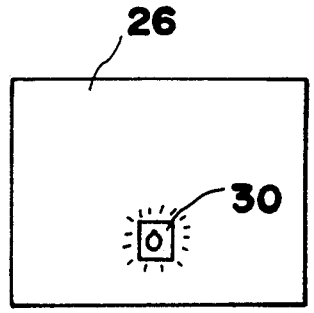

At this time, which of the battery voltage drop, tape end approach or dew condensation the warning by the red light emitting diode 15 indicates can be confirmed by inspecting the CRT in the eyepiece 13. Specifically, the CRT is enabled to indicate in the finder: the operation of the photography or the pause; and the warning of the battery voltage drop, the tape end approach or the dew condensation, as illustrated in FIG. 6. For example, the photography is indicated by "REC" in the lower portion of the display screen 26, as shown in FIG. 6(a). For the pause, the indication "REC" is replaced by the indication of "PAUSE". If, during this photography, the battery voltage drops, a battery mark 28 appears and flashes at 1 Hz above an autofocus photometric frame 27 as the center of the display screen 26, as shown in FIG. 6(b). If, during the photography, the end of the tape as a recording medium comes near, a cassette mark 29 appears and blinks at 1 Hz below the auto-focus photometric frame 27 at the center of the display screen 26, as shown in FIG. 6(c). If, during the photography, the dew is condensed on the rotary cylinder constituting the recorder, a water droplet mark 30 appears and blinked in a position like that of the cassette mark 29, as shown in FIG. 6(d). At this time, the recording operation is interrupted to the paused state. The indications in the finder thus far described will be tabulated in the following.

TABLE 3

| State of Video Camera | | Indications in Finder |
|---|---|---|
| | Photography | REC |
| | Pause | PAUSE |
| Warning | Voltage Drop | Battery mark blinks at 1 Hz |
| | Tape End coming | Cassette mark blinks at 1 Hz |
| | Dew Condensation | Droplet mark blinks at 1 Hz |

Moreover, the control unit D is constructed to accomplish the operations, as enumerated in Table 4, after the warning indications by the red light emitting diode 15 so that there arises no structural disadvantage even if no proper countermeasure is taken after the warnings.

TABLE 4

| Warning | | Warning Time | Subsequent Operation |
|---|---|---|---|
| Battery Voltage Drop | Power ON | Main voltage drops from 9.6 to 9.2 V | Warn till 8.8 V, then Power OFF |
| | Pause | Main voltage drops from 9.6 to 9.2 V | Warn till 8.8 V, then Power OFF |
| | Photography | Main voltage drops from 9.6 to 9.2 V | Warn till 8.8 V, then Pause & Power OFF |
| Close to Tape End | Power ON | No Warning | No change |
| | Pause | No Warning | No change |
| | Photography | 2 or 3 min. before tape end | Warn till tape end, then Unload & Stop |
| Dew Condensed | Power ON | Dew Condensed | Warn till dew is dried |
| | Pause | Dew Condensed | Warn till tape end, then Unload & Stop |
| | Photography | Dew Condensed | Warn till dew is dried, Pause to unload & Stop |

As a result, it is possible to eliminate the disadvantage that the recording means is left in its recording state to have its pinch rollers or the like deformed, even i the battery voltage drops to a level disabling the recording means. There is eliminated another disadvantage that the tape or recording means is left units recording state at its tail and is damaged even the tape comes to the vicinity to its tail during the photography. Further eliminated is a disadvantage that the recording means is left in its recording state so that theater is damaged by the rotary head even if dew is condensed on the rotary head during the photography.

Thus, according to the present embodiment, for the ordinary photography by observing the finder, the state of the video camera can be confirmed with the indication in the finder. For either the photography without the observation or the pause of the photography or when the main switch is turned on for the photography, the state of the video camera can be confirmed through the red light emitting diode which is mounted in the camera. When the warning is visually confirmed by the flash of the red light emitting diode, its content can be discriminated by inspecting the finder. Moreover, the camera is prevented from any damage even if no proper countermeasure (such as the replacement of the battery of cassette or the drying of the dew) is taken after the warning.

Other modifications are possible without departing from the spirit of this invention and the foregoing description is to be considered as illustrative only and not as limiting the scope of the invention as defined by the appended claims.

What is claimed is:

1. A video camera for recording pictures comprising:
    means for recording pictures to a medium;
    first detecting means for detection that the end of the medium for recording is near;
    second detecting means for detecting that a voltage of a power source is below as predetermined level;
    a single element, provided as a first indicator on the front surface of the video camera, for indicating that the recording is carried out by the recording means in a first sate and that the end of the medium for recording is near of the voltage of the power source is below the predetermined level in a second state; and
    means or changing the indicating same of the single element from the fist state to the second state when the first detecting means detects that the end of the medium for recording is near or the second detecting means detects that the voltage of the power source is below the predetermined level during the recording by the recording means.

2. The video camera of claim 1, further comprising a second indicator which is provided in a finder for indicating that the recording is carried out by the recording means.

3. The video camera of claim 1, further comprising a second indicator which is provided in a finder for indicating that the first detecting means defects that the end of the medium for recording is near, and a third indicator which is provided in the finder for indicating that the second detecting means detects that the voltage of the power source is below the predetermined level.

4. The video camera of claim 1, wherein the single element provided as a first indicator is a light emitting diode.

5. A video camera which can indicate various kinds of camera conditions comprising:
    first indicating means provided on the front surface of the video camera for indicating plural kinds of camera conditions in the same indicating state irrespective of the kind of the camera condition, said plural kinds of camera conditions making it impossible to continue recording pictures; and
    second indicating means provided in a finder for indicating what kind of the camera condition is indicated by said first indicating means.

6. A video camera for recording pictures comprising:
    means for recording pictures to a medium;
    first indicating means provided on the front surface of the video camera for indicating that the recording is carried out by the recording man in a first state and for indicating plural kinds of camera conditions in a second state;
    second indicating means provided in a finder for indicating what kind of camera condition is indicated by said first indicating means in the second state;
    first controlling means for controlling the first indicating means so as to change the indicating state from the first state to the second state when one of the plural kinds of camera conditions occurs during the recording by the recording means; and
    second controlling means of controlling the second indicating means so as to indicate the kind of occurring camera condition.

7. The video camera of claim 6, further comprising means for detecting that the end of the medium for recording is near, and one of the plural kinds of camera conditions is that the end of the medium for recording is near.

8. The video camera of claim 6, further comprising means for detecting that a voltage of a power source is below a predetermined level, and one of the plural kinds of camera conditions is that the voltage of the power source is below the predetermined level.

9. The video camera of claim 6, further comprising means for detecting dew in the recording means, and one of the plural kinds of camera conditions is that dew id formed in the recording means.

10. A video camera for recording pictures comprising:
    means for recording pictures to a medium;
    first indicating means provided on the front surface of the video camera for indicating that the recording is carried out by the recording means in a first indicating state, wherein said indicating means further indicates plural kinds of camera conditions which make it impossible to continue recording pictures in at least one indicating state different from said first indicating state;
    second indicating means provided in a finder for indicating what kind of camera condition is indicated by said first indicating means;
    first controlling means for controlling the first indicating means so as to change the indicating state when one of the plural kinds of camera conditions occurs during the recording by the recording means; and
    second controlling means for controlling the second indicating means so as to indicate the kind of the occurring camera condition.

* * * * *

UNITED STATES PATENT AND TRADEMARK OFFICE
CERTIFICATE OF CORRECTION

PATENT NO. : 5,189,524

DATED : February 23, 1993

INVENTOR(S) : Tadahiro Yoshida, et al.

It is certified that error appears in the above-identified patent and that said Letters Patent is hereby corrected as shown below:

In Col. 3, line 32, delete ")" [parenthesis].

In Col. 5, line 60, change "all of L" to --all at L--.

In Col. 6, line 2, change "the stands" to --he stands--.

In Col. 6, line 26, change "blinked" to --blinks--.

In Col. 7, line 1, change "i" to --if--.

In Col. 7, line 4, change "units" to --in its--.

In Col. 7, line 5, after "even" insert --if--.

In Col. 7, line 8, change "theater" to --the tape--.

In Col. 7, line 35 (Claim 1, line 3), change "detection" to --detecting--.

In Col. 7, line 38 (Claim 1, line 6), change "as" to --a--.

In Col. 7, line 43 (Claim 1, line 11), change "of" (first occurrence) to --or--.

UNITED STATES PATENT AND TRADEMARK OFFICE
CERTIFICATE OF CORRECTION

PATENT NO. : 5,189,524

DATED : February 23, 1993

INVENTOR(S) : Tadahiro Yoshida, et al.

It is certified that error appears in the above-identified patent and that said Letters Patent is hereby corrected as shown below:

In Col. 7, line 46 (Claim 1, line 14), change "or" to --for--; change "same" to --state--.

In Col. 7, line 47 (Claim 1, line 15), change "fist" to --first--.

In Col. 7, line 60 (Claim 3, line 3), change "defects" to --detects--.

In Col. 8, line 16 (Claim 6, line 5), change "man" to --means--.

In Col. 8, line 28 (Claim 6, line 17), change "of" to --for--.

In Col. 8, line 44 (Claim 9, line 4), change "id" to --is--.

Signed and Sealed this

Fourteenth Day of December, 1993

Attest:

*Attesting Officer*

BRUCE LEHMAN

*Commissioner of Patents and Trademarks*